United States Patent
Abe et al.

(10) Patent No.: US 7,761,221 B2
(45) Date of Patent: Jul. 20, 2010

(54) VARIABLE VALVE CONTROLLER FOR AN INTERNAL COMBUSTION ENGINE AND METHOD FOR OPERATING THE SAME

(75) Inventors: Kazuhiko Abe, Kawasaki (JP); Youichi Oshimi, Machida (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 166 days.

(21) Appl. No.: 12/188,311

(22) Filed: Aug. 8, 2008

(65) Prior Publication Data

US 2009/0043483 A1   Feb. 12, 2009

(30) Foreign Application Priority Data

Aug. 10, 2007   (JP) .............................. 2007-210042

(51) Int. Cl.
F02D 45/00 (2006.01)
F02D 13/02 (2006.01)
F01L 13/00 (2006.01)

(52) U.S. Cl. ..................... 701/105; 701/114; 123/90.15

(58) Field of Classification Search ................. 701/105, 701/102, 114, 115; 123/90.11, 90.12, 90.15–90.18
See application file for complete search history.

(56) References Cited

U.S. PATENT DOCUMENTS 6,405,697 B2 * 6/2002 Mikame .................. 123/90.17
6,990,937 B2 * 1/2006 Shindou et al. .......... 123/90.15

* cited by examiner

Primary Examiner—Hieu T Vo
(74) Attorney, Agent, or Firm—Drinker Biddle & Reath LLP (57) ABSTRACT

A variable valve controller for internal combustion engines and methods for operating the same. In the variable valve controller, and engine control unit (ECM) calculates a target value of a valve lift (VEL) for an intake valve and transmits it to a controller with a second control unit (VEL-C/U). The VEL-C/U controls the VEL on the basis of the VEL target value, detects a VEL actual value, and transmits it to the ECM. The ECM calculates a target value of a valve timing (VTC), and controls the VTC. Also, the ECM controls a limit value for the VTC target value in accordance with the VEL actual value. Fail-safe control is performed when an error occurs in a communication unit or a sensor. To reliably perform the control in a period from occurrence of an error to detection of the error, the limit value is set with calculation by offsetting a limit basic value set in accordance with the VEL actual value, by a displacement of the VEL within a time necessary for detecting the error.

16 Claims, 11 Drawing Sheets

VARIABLE VALVE CONTROLLER FOR AN INTERNAL COMBUSTION ENGINE AND METHOD FOR OPERATING THE SAME

CROSS-REFERENCE TO RELATED APPLICATIONS

This application claims priority to Japanese Patent Application No. 2007-210042 filed Aug. 10, 2007, which is incorporated by reference herein in the entirety.

BACKGROUND OF THE INVENTION

1. Field of the Invention

The present invention relates to variable valve controllers for internal combustion engines and methods for operating the same. More particularly, the present invention relates to a variable valve controller including a first variable valve mechanism capable of changing a valve timing, and a second variable valve mechanism capable of changing a valve lift, and a method for operating the same.

2. Description of Related Art

Variable valve controllers for internal combustion engines are known in some respects. For example, Japanese Unexamined Patent Application Publication No. 2002-285871 discloses a variable valve controller for an internal combustion engine in which a control range of one of a valve timing and a valve lift is limited in accordance with a control condition of the other of the valve timing and the valve lift when the valve timing and the valve lift are to be controlled.

In particular, a target value of a valve lift of an intake valve is calculated to control the valve lift based on the target value. Also, an actual value of the valve lift is detected, and an advance limit value of a valve timing of the intake valve is set on the basis of the actual value of the valve lift, to control the valve timing so as not to exceed the advance limit value. Accordingly, the intake valve is prevented from interfering with a piston.

The variable valve controller for the internal combustion engine detects an error of a system and attempts to perform fail-safe control. However, if it is difficult to cooperatively control the valve timing and the valve lift due to the error, the valve timing may be a value exceeding the limit value before detection of the error because the detection of the error may take a long time. Hence, the intake valve may interfere with the piston before the fail-safe control is started.

BRIEF SUMMARY OF THE INVENTION

In light of the above situations, an object of the present invention is to reliably control an intake valve or an exhaust valve in a period from occurrence of an error to detection of the error. Accordingly, an embodiment of the present invention provides a variable valve controller for an internal combustion engine. In the variable valve controller, a limit value of one of first and second variable valve mechanisms is set in accordance with a control condition of the other one of the first and second variable valve mechanisms, and an operation limit value of the one of the first and second variable valve mechanisms is an operation limit value including a displacement by which the other one of the first and second variable valve mechanisms is displaceable within a time necessary for detecting an error with an error detecting unit.

Hence, even when the variable valve mechanism is displaced by an amount causing the variable valve mechanism to exceed the limit value in a period from occurrence of an error to detection of the error, since the limit value including the displacement is set, an intake valve or an exhaust valve would not interfere with a piston. Therefore, the intake valve or the exhaust valve can be reliably controlled.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Exemplary embodiments of the present invention will now be explained in detail with reference to the drawings.

Figure 1:
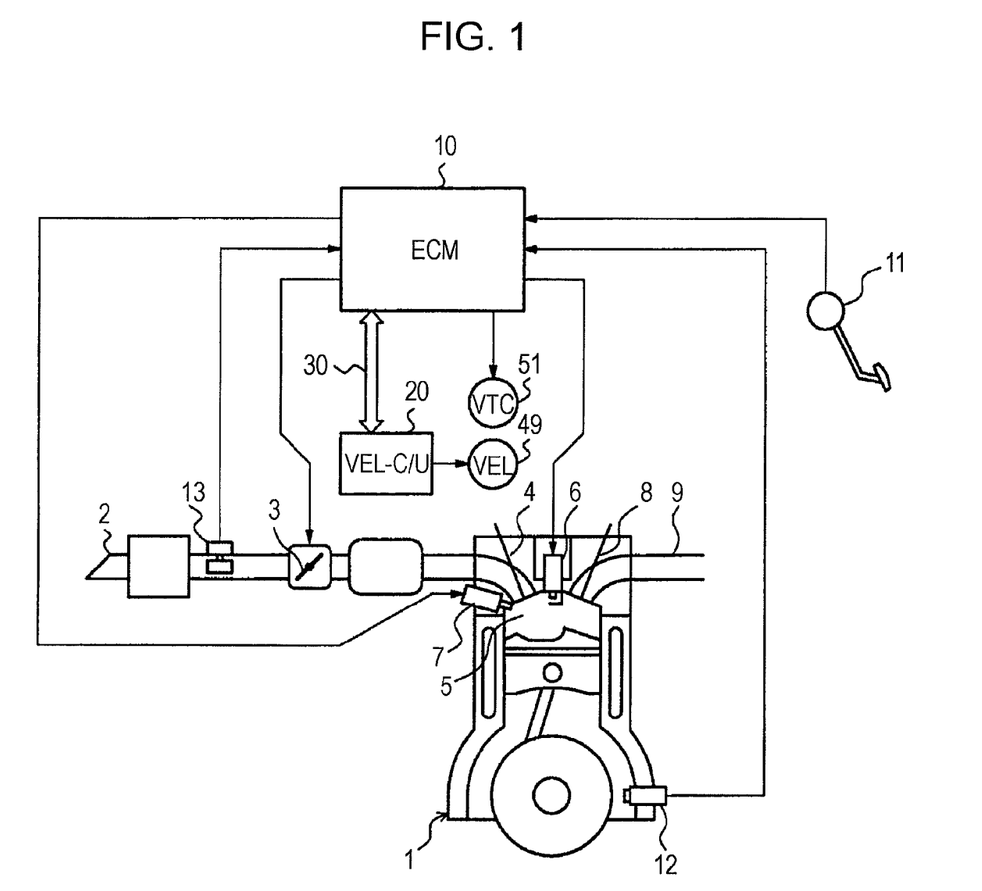
FIG. 1 is a system diagram showing an example of an engine according to an embodiment of the present invention.

FIG. 1 is a system diagram showing an example of an engine, such as a direct-injection spark-ignited internal-combustion engine, according to an embodiment of the present invention. Engine 1 has an intake passage 2 in which an electric-control throttle valve 3 is provided. The lift of the electric-control throttle valve 3 is controlled with an engine control unit (hereinafter, referred to as ECM) 10. Air controlled with the electric-control throttle valve 3 is taken into a combustion chamber 5 of the engine 1 through an intake valve 4.

The intake valve 4 is provided with a variable valve timing mechanism (VTC mechanism, which is referred to as VTC actuator 51) as a first variable valve mechanism capable of continuously changing a valve timing (center phase of valve event) of the intake valve 4, and a variable valve event and lift mechanism (VEL mechanism, which is referred to as VEL actuator 49) as a second variable valve mechanism capable of continuously changing a valve lift, in particular, a valve event (opening period) and a lift, of the intake valve 4. The details of these components will be described later.

In the combustion chamber 5 of the engine 1, a spark plug 6 and a fuel injection valve 7 are provided. The fuel injection valve 7 is opened when electric current is applied to a solenoid in response to an injection pulse signal output in an intake stroke or a compression stroke from the ECM 10 synchronously with rotation of the engine 1, to allow fuel with the pressure regulated to a predetermined value to be injected into the combustion chamber 5.

Fuel injected into the combustion chamber 5 forms fuel air mixture. The fuel air mixture is ignited with the spark plug 6 at a spark timing determined with the ECM 10, and combusted. Exhaust after the combustion is exhausted to an exhaust path 9 through an exhaust valve 8. The ECM 10 has engine operation conditions including, for example, an accelerator pedal opening degree APO detected with an accelerator pedal sensor 11, an engine speed Ne detected with a crank angle sensor 12, and an intake air quantity Qa detected with an air flow meter 13.

Figure 2:
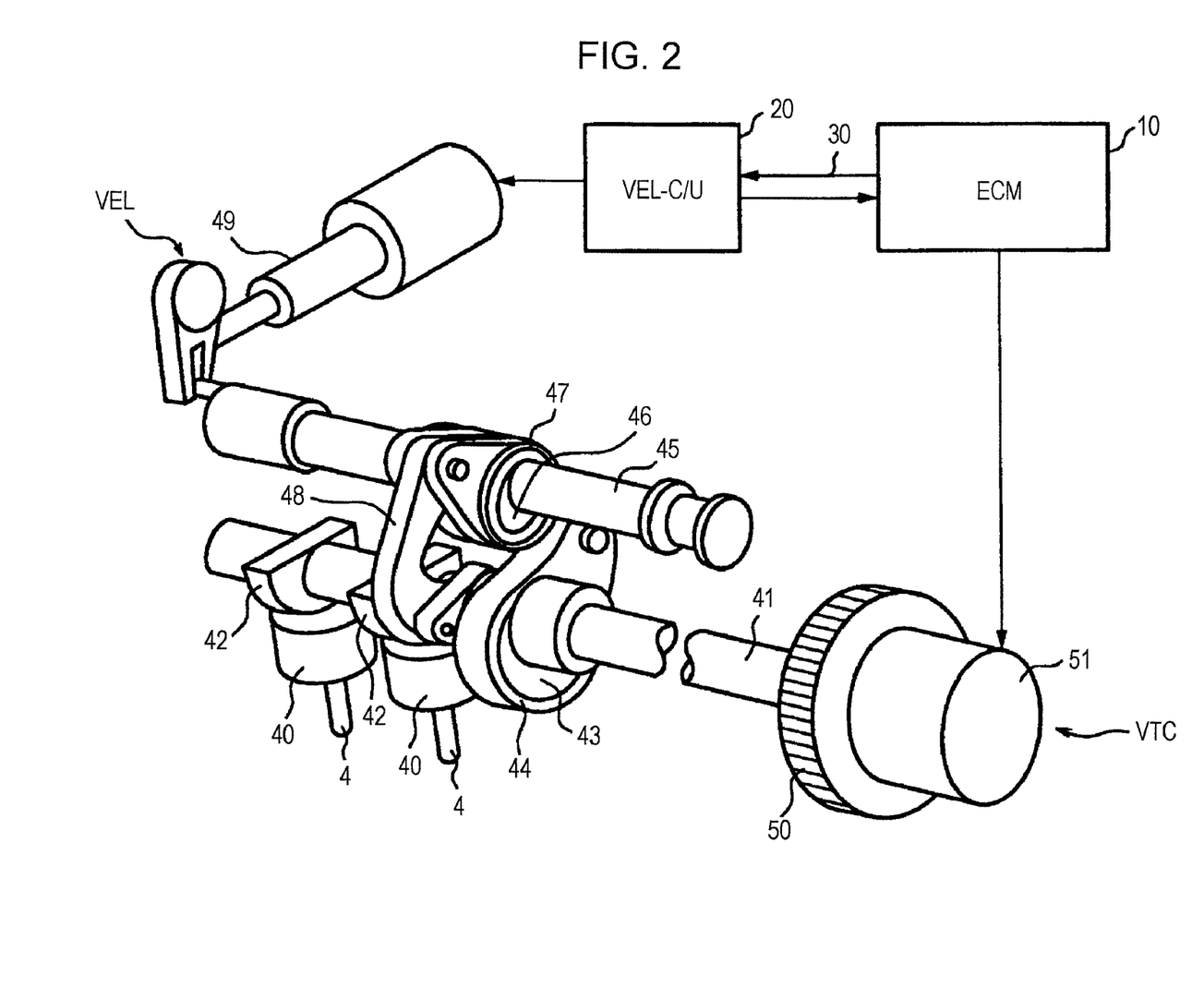
FIG. 2 is a block diagram showing examples of variable valve mechanisms.

Variable valve mechanisms of the intake valve 4 will now be described with reference to FIG. 2.

A camshaft 41 rotationally driven around an axis thereof in association with a crank shaft (not shown) is provided above valve lifters 40 located at end portions of intake valves 4 (two intake valves 4 are provided for one cylinder) and extends in a cylinder array direction. A rocker cam 42 is rockably attached onto the periphery of the camshaft 41 for each of the intake valves 4. When the rocker cam 42 contacts and presses the corresponding valve lifter 40, the intake valve 4 is opened or closed against a spring force of a valve spring (not shown).

The variable valve event and lift mechanism (VEL mechanism) is provided between the camshaft 41 and the rocker cam 42. The VEL mechanism can continuously perform variable control for a valve event (opening period) and a lift of the intake valve 4 by changing the posture of mechanical linkage between the camshaft 41 and the rocker cam 42.

The VEL mechanism includes a circular drive cam 43, a ring-like link 44, a control shaft 45, a circular control cam 46, a rocker arm 47, and a rod-like link 48. The drive cam 43 is provided eccentrically at the camshaft 41 in a rotatable manner integrally with the camshaft 41. The ring-like link 44 is fitted onto the periphery of the drive cam 43 in a rotatable manner relative to the drive cam 43. The control shaft 45 extends substantially in parallel to the camshaft 41 in the cylinder array direction. The control cam 46 is provided eccentrically at the control shaft 45 in a rotatable manner integrally with the control shaft 45. The rocker arm 47 is fitted onto the periphery of the control cam 46 in a rotatable manner relative to the control cam 46. An end of the rocker arm 47 is coupled to a tip end of the ring-like link 44 in a rotatable manner relative to the ring-like link 44. The rod-like link 48 is coupled to another end of the rocker arm 47 and to a tip end of the rocker cam 42 in a rotatable manner, thereby providing mechanical linkage between the rocker arm 47 and the rocker cam 42.

The camshaft 41 and the control shaft 45 are rotatably supported to a cylinder head of the engine 1 via a bearing bracket. An end of the control shaft 45 is connected to an output terminal of the variable valve event and lift actuator (VEL actuator) 49. The control shaft 45 is rotationally driven around an axis thereof within a predetermined control angle range, and held at a predetermined rotation phase with the VEL actuator 49.

With this configuration, when the camshaft 41 is rotated in association with the crank shaft, the ring-like link 44 is operated substantially synchronously via the drive cam 43. Also, the rocker arm 47 rocks around the control cam 46, and the rocker cam 42 rocks via the rod-like link 48. Accordingly, the intake valve 4 is opened or closed.

Also, when the control shaft 45 is rotated with the VEL actuator 49, the center position of the control cam 46, which serves as the rocking center of the rocker arm 47, is changed, the postures of the links 44 and 48 are changed, and a rocking angle range of the rocker cam 42 is changed. Accordingly, the valve event and the lift are continuously changed while the center phase of the valve event is kept substantially constant. In particular, the valve event and the lift are increased when the control shaft 45 is rotated in one direction, whereas the valve event and the lift are decreased when the control shaft 45 is rotated in the other direction.

When performing duty control on a quantity of electric current of the VEL actuator 49, a rotation phase of the control shaft 45 is changed. Hence, the valve event and the lift of the intake valve 4 can be changed (see line A in FIG. 3), thus defining the variable valve event and lift mechanism (VEL mechanism).

The camshaft 41 is driven when rotation of the crank shaft is input to a sprocket 50 via a timing belt. To change the valve timing, the rotary type actuator (VTC actuator) 51 is mounted between the sprocket 50 and the camshaft 41. The VTC actuator 51 can control the rotation phase of the sprocket 50 and the camshaft 41.

Figure 3:
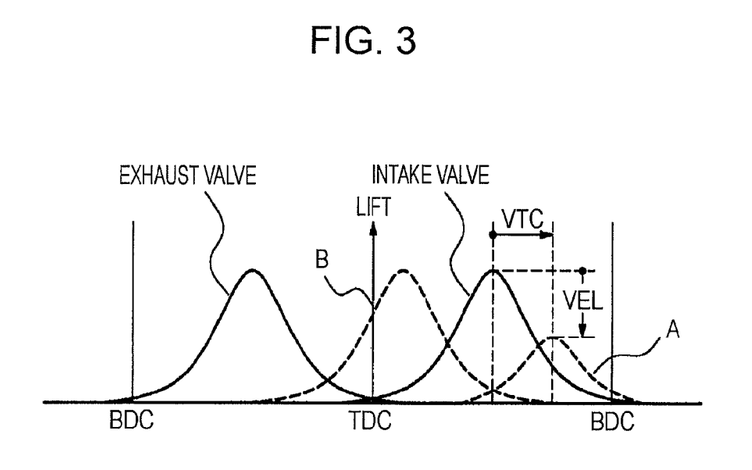
FIG. 3 is an example of a valve lift characteristic diagram provided by the variable valve mechanisms.

With the duty control on the quantity of electric current of the VTC actuator 51, the rotation phase of the crank shaft and the camshaft 41 are changed, and the valve timing of the intake valve 4 (center phase of valve event) can be changed (see line A in FIG. 3). With this configuration, the variable valve timing mechanism (VTC mechanism) is provided.

Figure 4:
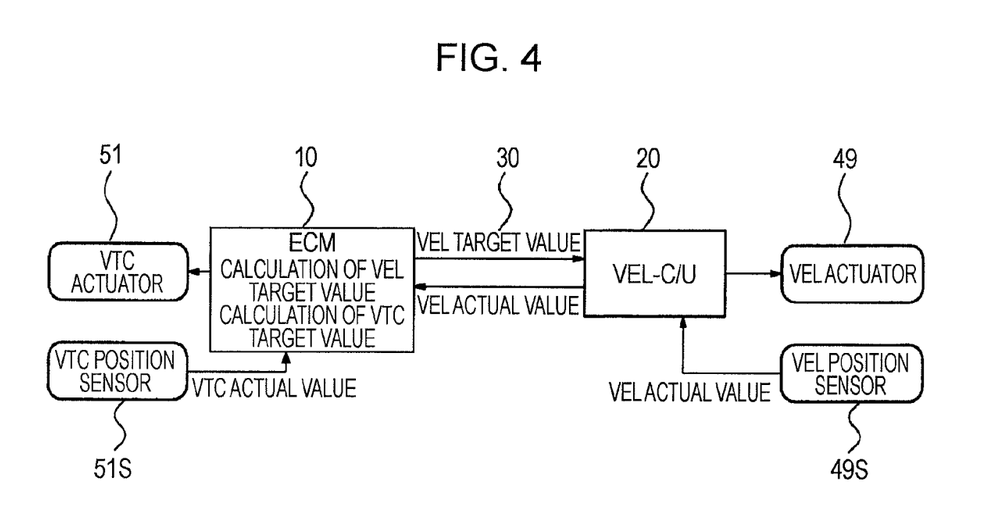
FIG. 4 is a block diagram showing an example of a control system.

Referring to FIG. 4 illustrating an exemplary configuration of a control system, the VTC actuator 51, or the VTC mechanism, is controlled with the ECM 10 serving as a first control unit, whereas the VEL actuator 49, or the VEL mechanism, is a controller with a second control unit (hereinafter, referred to as VEL-C/U) 20, which is separated from the ECM 10 serving as first control unit. To perform the control, the ECM 10 has a function of receiving a signal from a VTC position sensor 51S that detects an actual position of the VTC actuator 51 and detecting a VTC actual value (actual valve timing), whereas the VEL-CIU 20 has a function of receiving a signal from a VEL position sensor 49S that detects an actual position of the VEL actuator 49 and detecting a VEL actual value (actual valve lift).

The ECM 10 collectively has a function of calculating a VEL target value (target valve lift) in accordance with the engine operation conditions, and a function of calculating a VTC target value (target valve timing) in accordance with the engine operation conditions because the ECM 10 that receives signals of various sensors relating to the engine operation conditions. Hence, the ECM 10 and the VEL-C/U 20 are connected via a communication unit (controller area network, CAN) 30. The VEL target value (target valve lift) is transmitted from the ECM 10 to the VEL-C/U 20. The CAN connects the control units with two communication lines and provides serial communication therebetween, thereby providing data transmission between the control units. The VEL-C/U 20 transmits the VEL actual value (actual valve lift) to the ECM 10 for reasons such as discussed below.

Valve timing control and valve lift control of the intake valve should be separately performed. The control ranges thereof are set so as to maximally increase engine performance (operation performance, exhaust emission control performance, and the like) depending on the control characteristics. With the combination of the valve timing control and the valve lift control, for example, as shown in line B in FIG. 3, when the valve timing is controlled to the advance side and the valve lift is controlled to the high-lift side, the valve lift at the piston top dead center may become extremely large.

A maximum advance of the VTC mechanism and a maximum lift of the VEL mechanism of the intake valve are limited so as to prevent the valve lift from becoming excessively large at a point near the piston top dead center. At this time, if the limitation is mechanically provided with a stopper or the like, the control ranges are decreased, and the upper limits of the control amounts would be limited even for a valve timing and a valve lift which do not cause an interference between the intake valve and the piston. Therefore, advantages of increases in power and exhaust performance as a result of the combination of the valve timing control and the valve lift control of the exhaust valve would be insufficient.

Assuming that the VEL mechanism has a higher responsiveness than that of the VTC mechanism of the intake valve, an advance limit value for the VTC target value (target valve timing) is set in accordance with the VEL actual value (actual valve lift), and the VTC target value is limited so as not to exceed the advance limit value when the VTC target value is calculated. Due to this, the VEL-C/U 20 having the function of detecting the VEL actual value transmits the VEL actual value to the ECM 10 having the function of calculating the VTC target value.

It can be noted that in the embodiment described below with reference to a flowchart shown in FIG. 5, the VEL target value (target valve timing) is limited in accordance with the VTC actual value (actual valve timing) when the VEL target value is to be calculated. Since the ECM 10 has the function of calculating the VEL target value and the function of detecting the VTC actual value, the ECM 10 also performs limit processing, and transmits the VEL target value (target valve lift) after the limit processing to the VEL-C/U 20.

Figure 5:
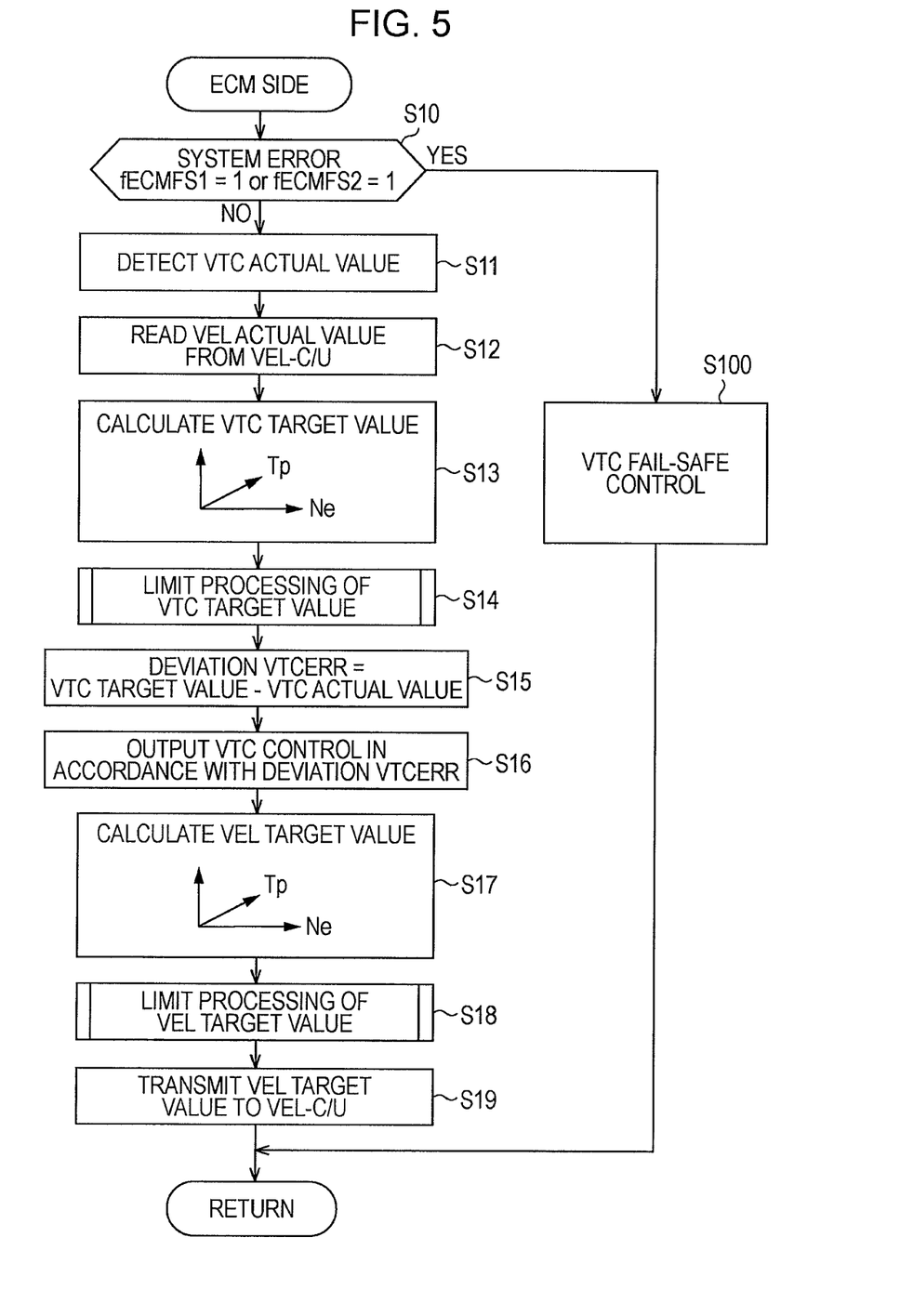
FIG. 5 is a flowchart showing an example of main control in an ECM.

FIG. 5 is a flowchart showing an example of main control in the ECM 10. In step S10, it is determined whether a system error is present. If no error is present, the process proceeds to step S11. The process when an error is present will be described later.

In step S11, a VTC actual value (actual valve timing) is detected on the basis of a detection signal of the VTC position sensor. In step S12, a VEL actual value (actual valve lift), which is detected with the VEL-C/U on the basis of a detection signal of the VEL position sensor and received from the VEL-C/U via the communication unit, is read.

Figure 11:
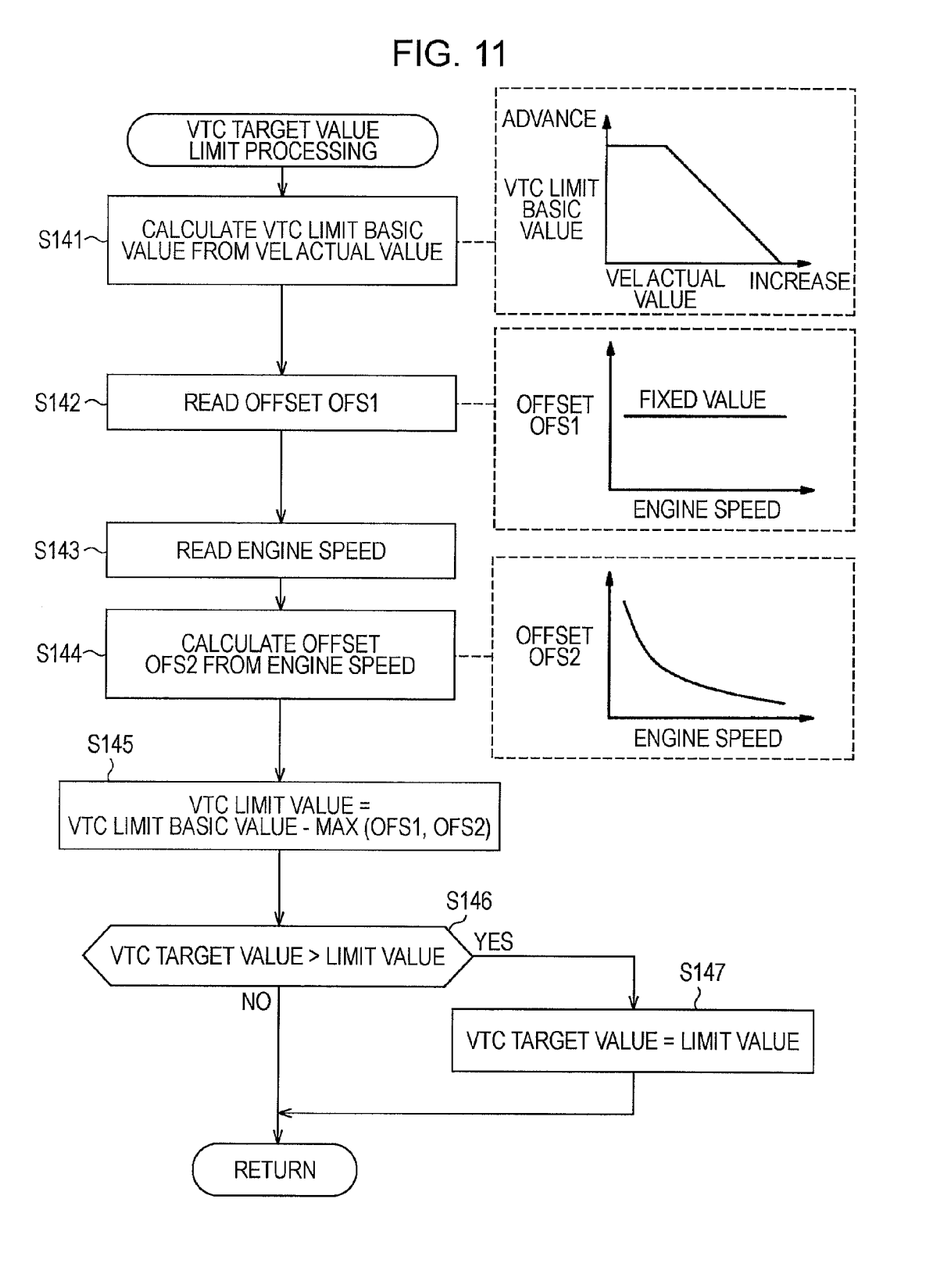
FIG. 11 is a flowchart showing an example of a subroutine of VTC target value limit processing.

In step S13, a VTC target value (target valve timing) is calculated with reference to a map on the basis of an engine speed Ne and a basic fuel consumption Tp (=K×Qa/Na, where K is constant) representing an engine load. In step S14, limit processing (processing for restricting a value to a limit value when exceeding the limit value) is performed for the VTC target value (target valve timing) according to, for example, a subroutine as shown in FIG. 11, which will be described later.

In step S15, a deviation VTCERR between the VTC target value (target valve timing) and the VTC actual value (actual valve timing) is calculated. In step S16, a control output for the VTC actuator is calculated and output so that the VTC actual value agrees with the VTC target value in accordance with the deviation VTCERR, thereby performing feedback control, to control the valve timing.

In particular, at first, a proportional control amount VTCp, an integral control amount VTCi, and a differential control amount VTCd are obtained by the following expressions, on the basis of feedback gains Gp (proportional value), Gi (integral value), and Gd (differential value):

$$VTCp = Gp \cdot VTCERR$$

$$VTCi = VTCiz + Gi \cdot VTCERR$$

$$VTCd = Gd \cdot VTCERR - VTCERRz)$$

where z is a previous value.

Then, a VTC duty value VTCDTY is calculated by adding a basic duty value BASDTYvtc and the control amounts VTCp, VTCi, and VTCd (see the following expression), to drive the VTC actuator on the basis of the calculated value as an output signal:

$$VTCDTY = BASDTYvtc + VTCp + VTCi + VTCd$$

Here, the position of the VTC actuator is held at a current position when the VTC duty value VTCDTY is equal to the basic duty value BASDTYvtc (for example, 50%). When a deviation is present, the VTC actuator is driven such that the position is set to the plus side or the minus side. When a deviation is eliminated, or the VTC duty value VTCDTY becomes equal to the basic duty value BASDTYvtc, and the position of the VTC actuator is held at the current position.

In step S17, a VEL target value (target valve lift) is calculated with reference to a map on the basis of an engine speed Ne and a basic fuel consumption Tp representing an engine load. In step S18, limit processing (processing for restricting a value to a limit value when exceeding the limit value) is performed for the VEL target value (target valve lift) according to a subroutine in FIG. 12, which will be described later. In step S19, the VEL target value is transmitted to the VEL-C/U via the communication unit.

Figure 6:
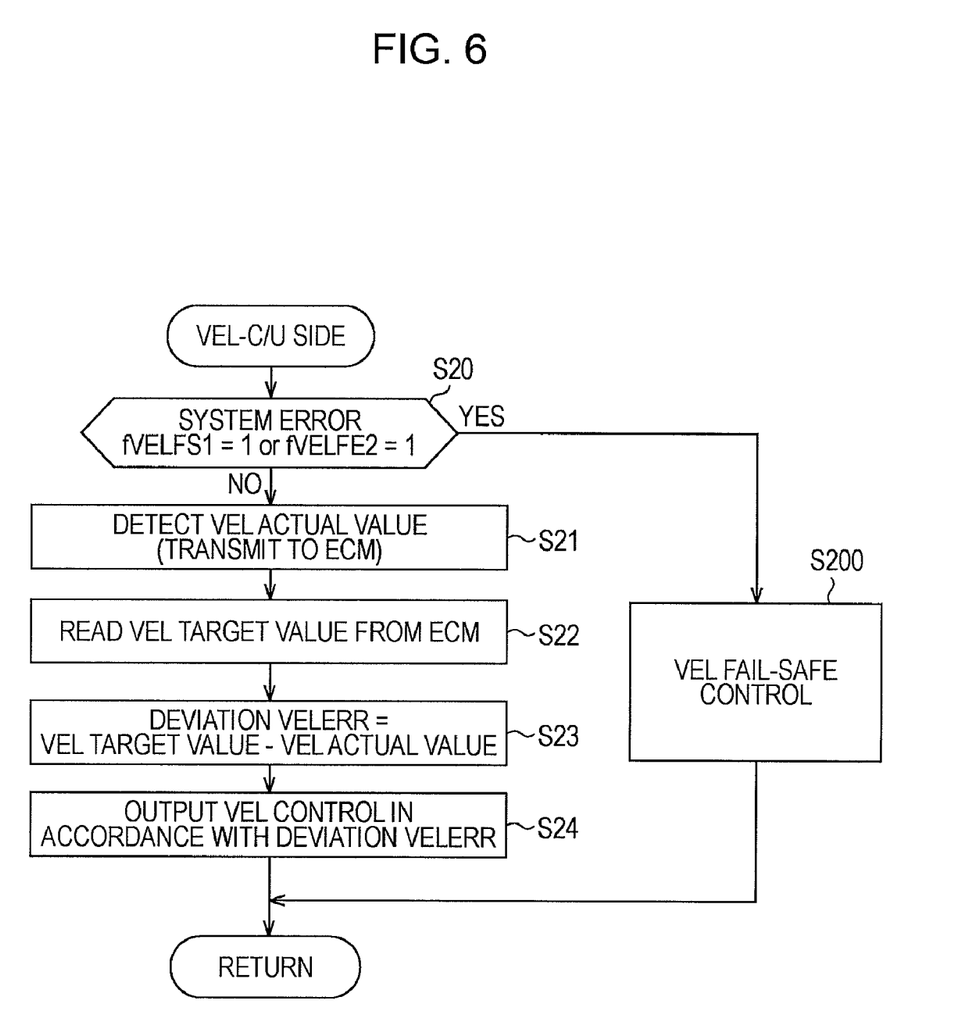
FIG. 6 is a flowchart showing an example of main control in a VEL-C/U.

FIG. 6 is a flowchart showing an example of main control in the VEL-C/U 20, which is described below.

In step S20, it is determined whether a system error is present. If no error is present, the process goes to step S21. The process when an error is present will be described later.

In step S21, a VEL actual value (actual valve timing) is detected on the basis of a detection signal of the VEL position sensor. The detected VEL actual value is transmitted to the ECM via the communication unit.

In step S22, a VEL target value (target valve lift), which is calculated with the ECM and received from the ECM via the communication unit, is read. In step S23, a deviation VEL-ERR between the VEL target value (target valve lift) and the VEL actual value (actual valve lift) is calculated.

In step S24, a control output for the VEL actuator is calculated and output so that the VEL actual value agrees with the VEL target value in accordance with the deviation VELERR, thereby performing feedback control, to control the valve lift. The detail of the feedback control is similar to the feedback control for the VTC actuator performed in the ECM.

Meanwhile, if a communication error occurs in the communication unit 30 provided between the ECM 10 and the VEL-C/U 20 in the system because of, for example, a failure in a communication function of a microcomputer (communication driver), a failure in a harness connector, or noise, the VEL target value or the VEL actual value to be transmitted via the communication unit 30 may become abnormal, resulting in the VTC control (valve timing control) including the VTC limit value setting on the basis of the VEL actual value in the ECM 10, and the VEL control (valve lift control) on the basis of the VEL target value in the VEL-C/U 20 being incorrectly performed. Therefore, a communication error of the communication unit 30 is detected, and when it is detected, fail-safe control is performed.

Detection of a communication error is briefly described below.

The control units (ECM 10, VEL-C/U 20) each have a communication error detecting unit that monitors a message counter, which is transmitted from the other control unit via the communication unit while being counted up every predetermined clock cycle, to detect a communication error. In particular, referring to FIG. 13, the ECM 10 transmits a message counter ECMVELCK to the VEL-C/U 20 while counting it up every predetermined cycle. The VEL-C/U 20 monitors the message counter ECMVELCK, and recognizes the condition as abnormal if the ECM 10 does not count up a message counter ECMVELCK every predetermined cycle.

Figure 13:
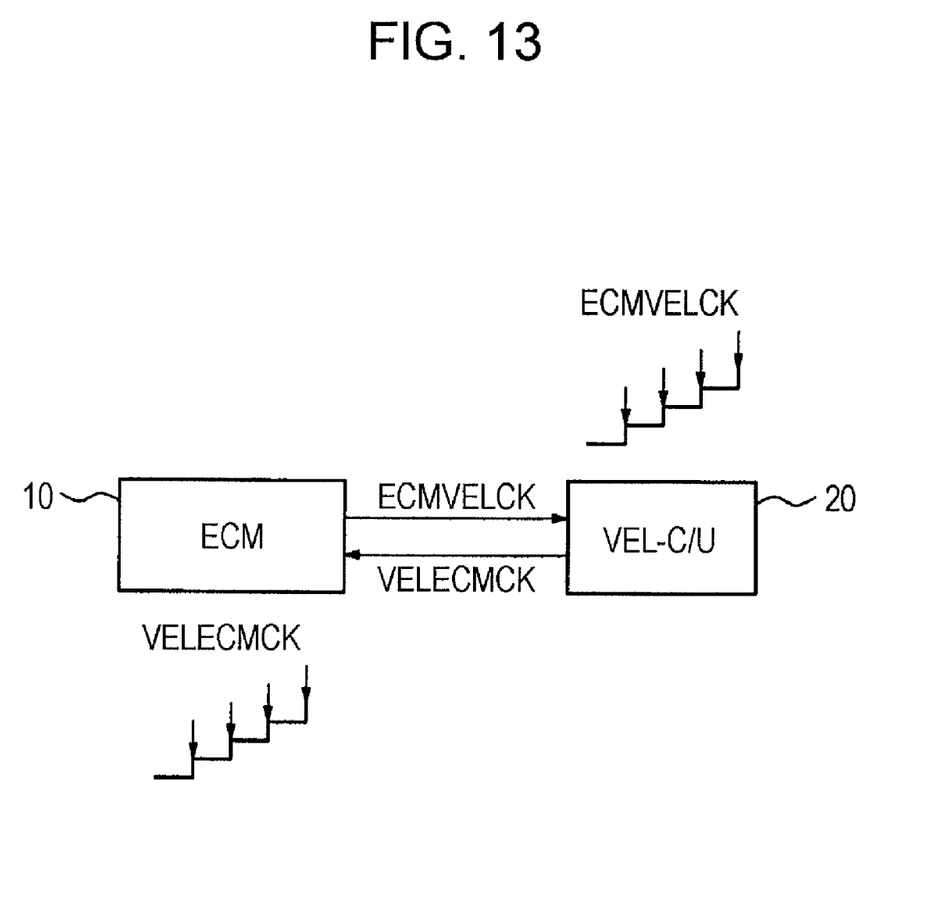
FIG. 13 is an explanatory illustration showing an example of a message counter used for detection of a communication error.

Also, the VEL-CIU 20 transmits a message counter VELECMCK to the ECM 10 while counting it up every predetermined cycle. The ECM 10 monitors the message counter VELECMCK, and recognizes the condition as abnormal if the VEL-C/U 20 does not count up a message counter VELECMCK every predetermined cycle.

Figure 7:
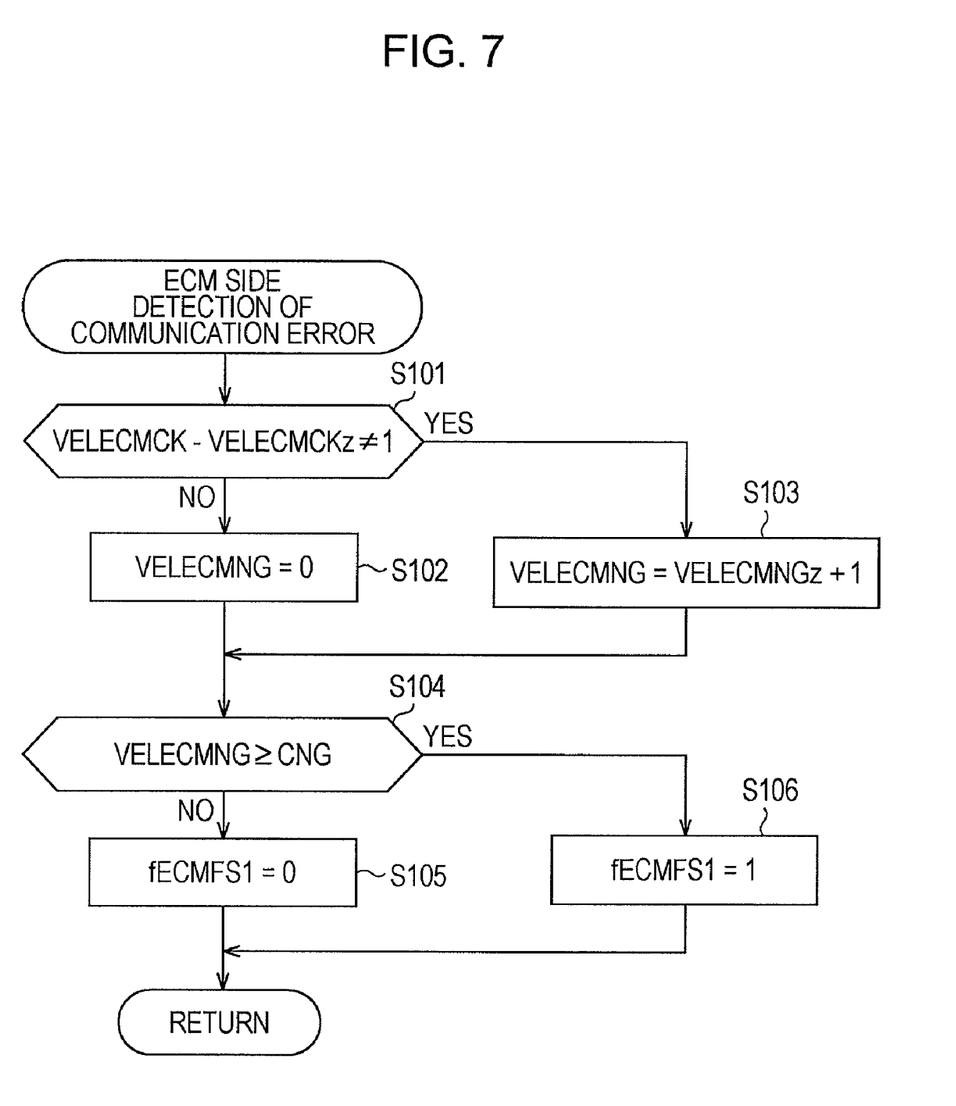
FIG. 7 is a flowchart showing an example of operations for detection of a communication error in the ECM.

FIG. 7 is a flowchart (performed every unit time) showing an example of operations for detecting a communication error of the ECM 10, which is described below. In step SI 01, a difference (counter deviation) between the message counter VELECMCK from the VEL-C/U and a previous value VELECMCKz is obtained, and it is determined whether the difference is a number other than 1, or 1. If the result is No (difference=1), the condition is normal. The process goes to step S102, in which an increment counter VELECMNG is set to 0 (VELECMNG=0).

In contrast, if the result is YES (difference≠1), counting up is incorrect, and thus the condition is abnormal. The process proceeds to step S103, in which the increment counter VELECMNG is incremented by 1 (VELECMNG=VELECMNGz+1).

In step S104, it is determined whether the increment counter VELECMNG is at least a predetermined abnormal-determination judgment value CNG (VELECMNG≧CNG) or not. If No (VELECMNG<CNG), the condition is normal. The process goes to step S105, in which a first fail-safe flag FECMFS1 is set to 0 (fECMFS1=0).

In contrast, if YES (VELECMNG≧CNG), the communication error is determined. The process goes to S106, in which the first fail-safe flag fECMFS1 is set to 1 (FECMFS1=1), so that the process shifts to fail-safe control.

Figure 8:
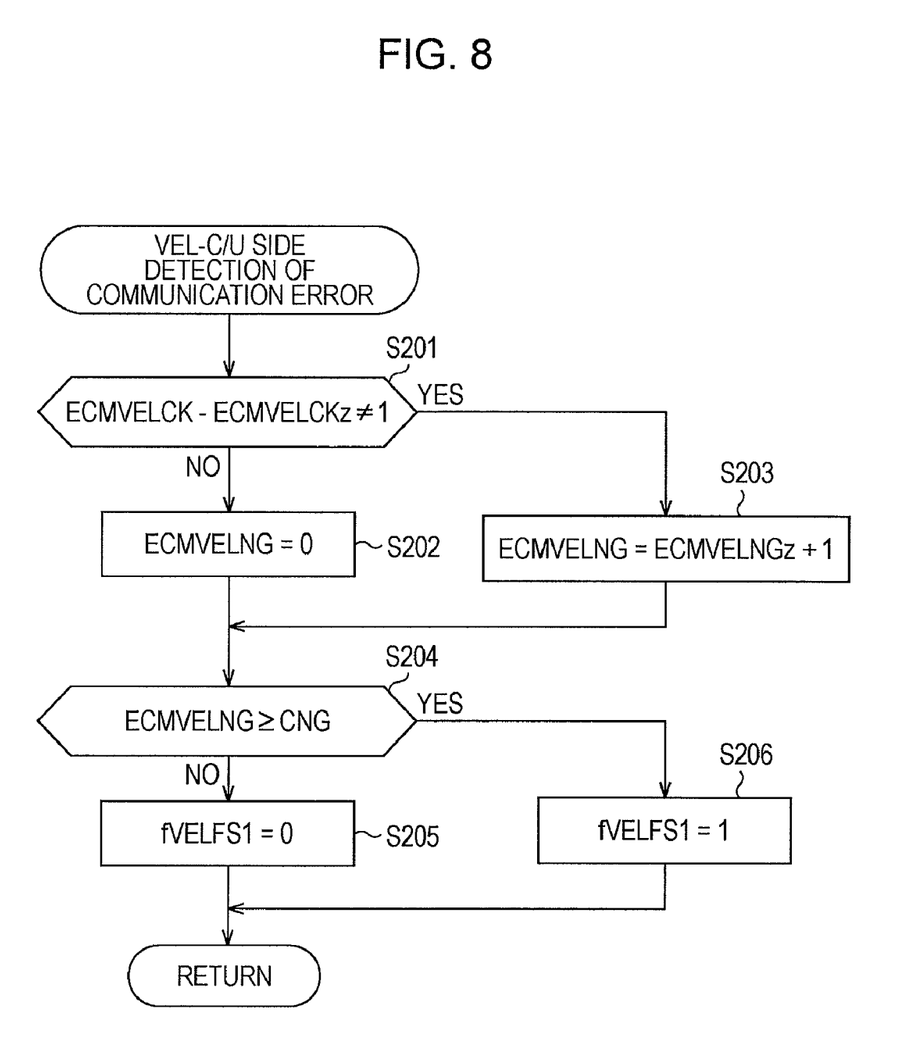
FIG. 8 is a flowchart showing an example of operations for detection of a communication error in the VEL-C/U.

FIG. 8 is a flowchart (performed every unit time) showing an example of operations for detection of communication error of the VEL-C/U 20, which is described below. In step S201, a difference (counter deviation) between the message counter ECMVELCK from the ECM and a previous value ECMVELCKz is obtained, and it is judged whether the difference is a number other than 1, or 1. If the result is No (difference=1), the condition is normal. The process goes to step S202, in which an increment counter ECMVELNG is set to 0 (ECMVELNG=0).

In contrast, if the result is YES (difference≠1), counting up is incorrect, and thus the condition is abnormal. The process goes to step S203, in which the increment counter ECMVELNG is incremented by 1 (ECMVELNG=ECMVELNGz+1).

In step S204, it is determined whether the increment counter ECMVELNG is at least a predetermined abnormal-determination judgment value CNG (ECMVELNG≧CNG) or not. If the result is No (ECMVELNG<CNG), the condition is normal. The process goes to step S205, in which a first fail-safe flag FVELFS1 is set to 0 (fVELFS1=0).

In contrast, if the result is YES (ECMVELNG≧CNG), the communication error is determined. The process goes to S206, in which the first fail-safe flag fVELFS1 is set to 1 (fVELFS1=1), so that the process shifts to fail-safe control.

In the above-described system, if a sensor error (failure) occurs in the VTC position sensor 51S or the VEL position sensor 49S, the VTC control (valve timing control) or the VEL control (valve lift control) may be incorrectly performed. Therefore, when a sensor error of the VTC position sensor 51S or the VEL position sensor 49S is detected, that is, when a sensor error is detected, fail-safe control is performed.

Figure 9:
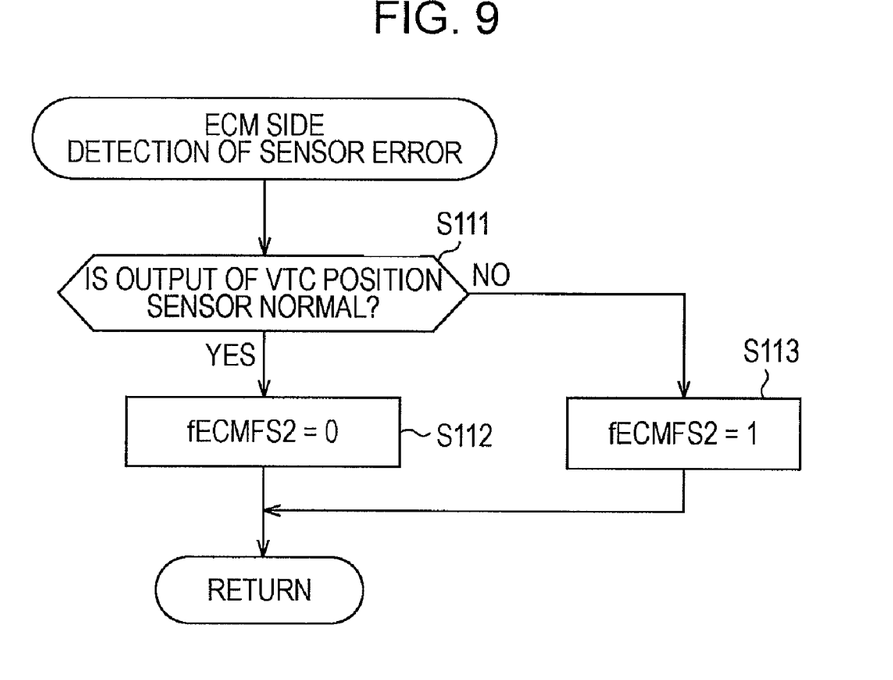
FIG. 9 is a flowchart showing an example of operations for detection of a sensor error in the ECM.

FIG. 9 is a flowchart showing an example of operations for the detection of a sensor error in the ECM 10, which is described below.

In step S111, it is determined whether an output of the VTC position sensor is normal or not. The output of the VTC position sensor is obtained synchronously with rotation. Hence, the output is determined to be abnormal if the output is not obtained at a timing synchronous with rotation, or if an output value is markedly deviated from a normal range.

When the output is determined to be normal, the process goes to step S112, in which a second fail-safe flag fECMFS2 is set to 0 (fECMFS2=0). In contrast, if the output is determined to be abnormal, the process goes to step S113, in which the second fail-safe flag fECMFS2 is set to 1 (fECMFS2=1), so that the process shifts to fail-safe control.

Figure 10:
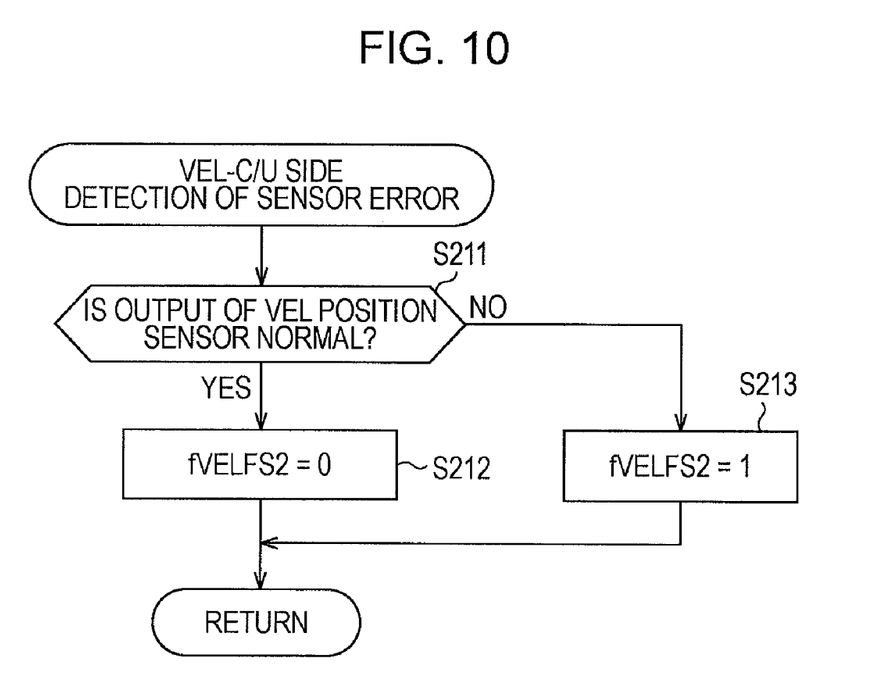
FIG. 10 is a flowchart showing an example of operations for detection of a sensor error in the VEL-C/U.

FIG. 10 is a flowchart showing an example of operations for detection of a sensor error in the VEL-C/U 20, which is described below.

In step S211, it is determined whether an output of the VEL position sensor is normal or not. The output of the VEL position sensor is obtained synchronously with rotation. Hence, the output is determined to be abnormal if the output is not obtained at a timing synchronous with rotation, or if an output value is markedly deviated from a normal range.

If the output is determined to be normal, the process goes to step S212, in which a second fail-safe flag fVELFS2 is set to 0 (fVELFS2=0). In contrast, if the output is judged determined to be abnormal, the process goes to step S213, in which the second fail-safe flag fVELFS2 is set to 1 (fVELFS2=1), so that the process shifts to fail-safe control.

It is noted that the first fail-safe flag FECMFS1 and the second fail-safe flag fECMFS2 set in the ECM 10 are transmitted to the VEL-C/U 20 via the communication unit 30. On the other hand, the first fail-safe flag fVELFS1 and the second fail-safe flag fVELFS2 set in the VEL-C/U 20 are transmitted to the ECM 10 via the communication unit 30. Thus, information is shared as much as possible.

Next, referring back to the flowcharts in FIGS. 5 and 6, an example of the fail-safe control operation performed when an error is detected will be described. In the main control in the ECM 10 shown in FIG. 5, the presence of a system error is judged in step S10. In particular, a system error is determined when first fail-safe flag fECMFS1=1 (communication error) or second fail-safe flag fECMFS2=1 (VTC position sensor error). Then, the process goes to step S100. Also, a system error is determined when the ECM 10 receives information representing that first fail-safe flag fVELFS1=1 (communication error) or second fail-safe flag fVELFS2=1 (VEL position sensor error) from the VEL-C/U 20. Then, the process goes to step S100.

In step S100, VTC fail-safe control is performed. In particular, the valve timing is controlled to a predetermined value (for example, a maximum retard position).

In the main control in the VEL-C/U 20 shown in FIG. 6, the presence of a system error is determined in step S20. In particular, a system error is determined when first fail-safe flag fVELFS1=1 (communication error), or second fail-safe flag fVELFS2=1 (VEL position sensor error). Then, the process goes to step S200. Also, a system error is determined when the VEL-C/U 20 receives information representing that first fail-safe flag FECMFS1=1 (communication error) or second fail-safe flag fVCMFS2=1 (YTC position sensor error) from the ECM 10. Then, the process goes to step S200.

In step S200, VEL fail-safe control is performed. In particular, the valve lift is controlled to a predetermined value (for example, to a medium lift). Or a VEL power relay is shut off. Accordingly, a VEL duty for the VEL actuator is forcibly set to 0%, to control the valve lift to a minimum lift. If a function of shutting off the VEL power relay is provided in the ECM 10, the ECM 10 performs shutting-off operation.

Next, a subroutine of VTC target value limit processing in FIG. 11 is described below. This subroutine is performed in step S14 in the main control in the ECM 10 shown in FIG. 5.

In step S141, a limit basic value toward the advance side for the VTC target value (target valve timing) is calculated with reference to a table on the basis of the VEL actual value (actual valve lift). When the VEL actual value (actual valve lift) is within a range on the low-lift side, the intake valve and the piston do not interfere with each other even if the VTC is controlled to the maximum advance position. Hence, the limit basic value for the VTC target value (target valve timing) is set to be the same as the maximum advance position which is regulated with a stopper mechanism of the VTC.

When the valve lift of the intake valve is within a range on the high-lift side, the intake valve and the piston may interfere with each other at the piston top dead center as the VTC approaches the maximum advance position. Hence, the limit basic value for the VTC target value is set gradually toward the retard side.

In step S142, an offset OFS1, which is a displacement by which the VTC is displaceable within a time necessary for detecting a communication error with the communication error detecting unit, is read. This step is for offsetting the VTC limit value toward the retard side in advance, so as to prevent the intake valve and the piston from interfering with each other even when the VTC is displaced in a period from occurrence of a communication error to detection of the communication error.

The time necessary for detecting a communication error may be a constant time, so that the time is not affected by the engine speed Ne. Hence, the offset OFS1 may be a predetermined constant value (fixed value). The time necessary for detecting a communication error may include not only a time that a value reaches CNG used as a threshold value for determination of abnormality in step S104 in the flowchart shown in FIG. 7, but also a time necessary for data transmission, a processing time after the determination, and the like, to obtain further reliable setting.

In step S143, an engine speed Ne is read. In step S144, an offset OFS2, which is a displacement by which the VTC is displaceable within a time necessary for detecting a sensor error with the sensor error detecting unit, is calculated with reference to a table on the basis of the engine speed Ne. This step is for offsetting the VTC limit value toward the retard side in advance, so as to prevent the intake valve and the piston from interfering with each other even when the VTC is displaced in a period from occurrence of a sensor error to detection of the sensor error.

The time necessary for detecting a sensor error may vary in accordance with an engine speed Ne. As the engine speed Ne increases, the time decreases (because the presence of an output in synchronization with rotation is judged). Hence, the offset OFS2 decreases as the engine speed Ne increases. The time necessary for detecting a sensor error may include a detection delay time of the sensor, to obtain further reliable setting.

In step S145, a VTC limit value is calculated by subtracting a larger one of the offsets OFS1 and OFS2 from the VTC limit basic value (see the following expression):

$$VTC \text{ limit value} = VTC \text{ limit basic value} - \max(OFS1, OFS2)$$

Here, max(OFS1, OFS2) which is a larger one of the offsets OFS1 and OFS2 is a displacement by which the VTC is displaceable within the time necessary for detecting an error with the error detecting unit.

In step S146, the VTC target value obtained in step S13 (FIG. 5) is compared with the VTC limit value obtained in step S145. If VTC target value>limit value (if the VTC target value is on the advance side with respect to the limit value), the process goes to step S147, in which it is set that VTC target value=limit value, thereby limiting the VTC target value, and then the process returns. If VTC target value≦limit value (if the VTC target value is on the retard side with respect to the limit value), the process directly returns.

Figure 12:
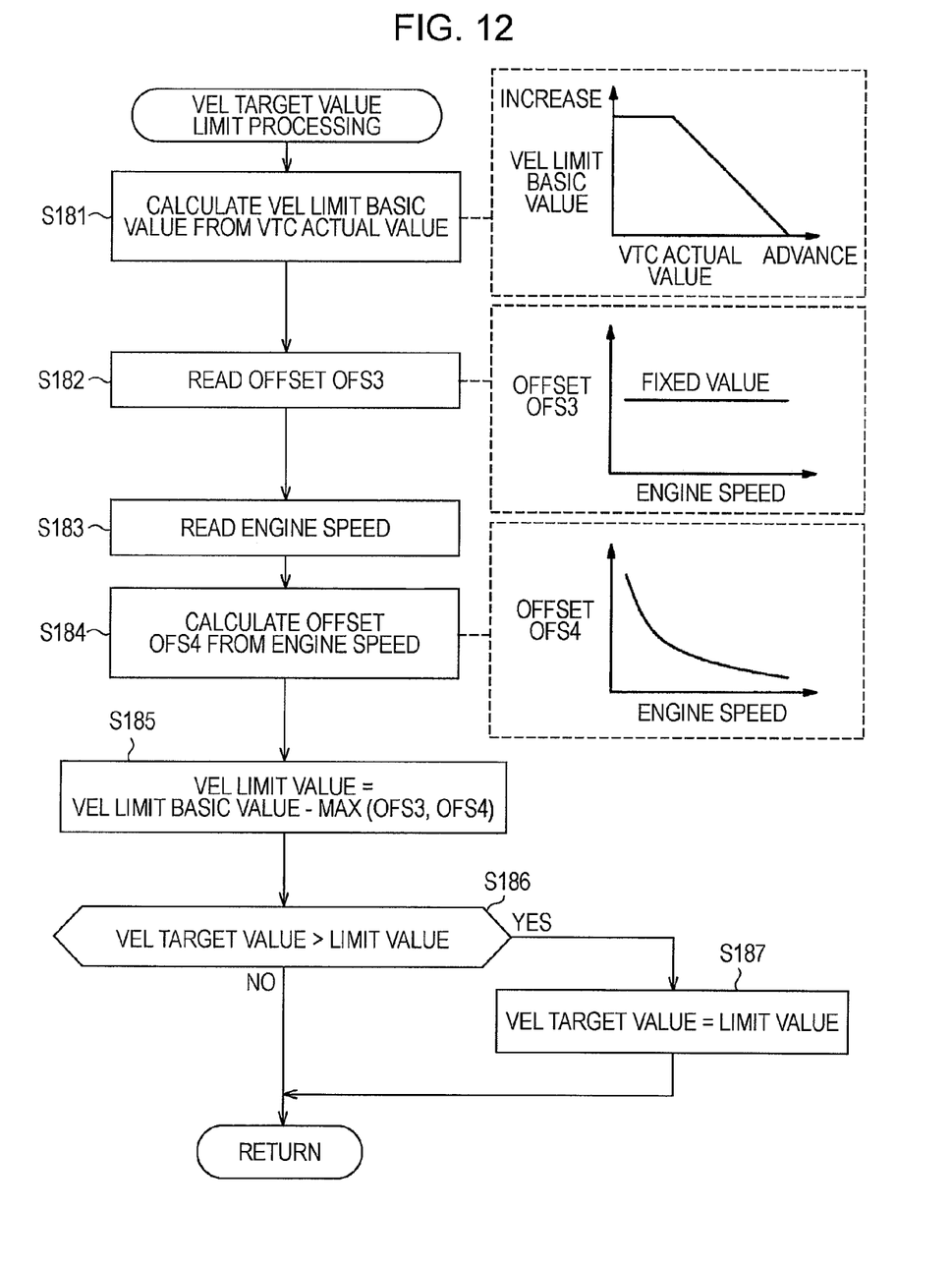
FIG. 12 is a flowchart showing an example of a subroutine of VEL target value limit processing.

Next, a subroutine of VEL target value limit processing in FIG. 12 is described below. This subroutine is performed in step S18 in the main control in the ECM 10 shown in FIG. 5.

In step S181, a limit basic value is calculated for the VEL target value (target valve lift) with reference to a table on the basis of the VTC actual value (actual valve timing). When the VTC actual value (actual valve timing) is within a range on the retard side, the intake valve and the piston do not interfere with each other even if the VEL is controlled to the maximum lift. Hence, the limit basic value for the VEL target value (target lift) is set to be the same as the maximum lift which is regulated with a stopper mechanism of the VEL.

When the valve timing of the intake valve is within a range on the advance side, the intake valve and the piston may interfere with each other at the piston top dead center as the VEL approaches the maximum lift. Hence, the limit basic value for the VEL target value is set gradually toward the low-lift side.

In step S182, an offset OFS3, which is a displacement by which the VEL is displaceable within a time necessary for detecting a communication error with the communication error detecting unit, is read. This step is for offsetting the VEL limit value toward the low-lift side in advance, so as to prevent the intake valve and the piston from interfering with each other even when the VEL is displaced in a period from occurrence of a communication error to detection of the communication error.

The time necessary for detecting a communication error may be a constant time, so that the time is not affected by the engine speed Ne. Hence, the offset OFS3 may be a predetermined constant value (fixed value).

In step S183, an engine speed Ne is read. In step S184, an offset OFS4, which is a displacement by which the VEL is displaceable within a time necessary for detecting a sensor error with the sensor error detecting unit, is calculated with reference to a table on the basis of the engine speed Ne. This step is for offsetting the VEL limit value toward the low-lift side in advance, so as to prevent the intake valve and the piston from interfering with each other even when the VEL is displaced in a period from occurrence of a sensor error to detection of the sensor error.

The time necessary for detecting a sensor error may vary in accordance with an engine speed Ne. As the engine speed Ne increases, the time decreases (because the presence of an output in synchronization with rotation is judged). Hence, the offset OFS4 decreases as the engine speed Ne increases.

In step S185, a VEL limit value is calculated by subtracting a larger one of the offsets OFS3 and OFS4 from the VEL limit basic value (see the following expression):

$$VEL \text{ limit value} = VEL \text{ limit basic value} - \max(OFS3, OFS4)$$

Here, max(OFS3, OFS4) which is a larger one of the offsets OFS3 and OFS4 is a displacement by which the VEL is displaceable within the time necessary for detecting an error with the error detecting unit.

In step S186, the VEL target value obtained in step S17 (FIG. 5) is compared with the VEL limit value obtained in step S185. If VEL target value>limit value (if the VEL target value is on the high-lift side with respect to the limit value), the process goes to step S187, in which it is set that VEL target value=limit value, thereby limiting the VEL target value, and then the process returns. If VEL target value≦limit value (if the VEL target value is on the low-lift side with respect to the limit value), the process directly returns.

While examples of variable valve mechanisms for the intake valve are described above, the embodiments of the present invention may be applied to variable valve mechanisms for an exhaust valve. This is because when both valve timing control and valve lift control are applied to the exhaust valve, a similar problem to that of the intake valve may occur. In particular, when a valve timing of the exhaust valve is controlled to the retard side and a valve lift thereof is controlled to the high-lift side, the lift of the exhaust valve may become excessively large at a position near a piston top dead center.

According to the embodiments described herein, a variable valve controller for an internal combustion engine includes a first variable valve mechanism (VTC mechanism) capable of changing a valve timing, and a second variable valve mechanism (VEL mechanism) capable of changing a valve lift. The first and second variable valve mechanisms are provided at least at one of an intake valve and an exhaust valve. The variable valve controller further comprises an operation limiting unit that controls at least one of the first and second variable valve mechanisms on the basis of a control condition of the other one of the first and second variable valve mechanisms, and an error detecting unit that detects an error of the variable valve controller to cause fail-safe control to be performed.

The operation limiting unit calculates the limit value by offsetting in which a limit basic value that is set for the one of the first and second variable valve mechanisms in accordance with the control condition of the other one of the first and second variable valve mechanisms by a displacement by which the other one of the first and second variable valve mechanisms is displaceable within a time necessary for detecting the error with the error detecting unit. Since the limit value is set with regard to the displacement even when the one of the first and second variable valve mechanisms is displaced over the limit value in a period from occurrence of an error to detection of the error, the intake valve or the exhaust valve can be reliably controlled without interfering with the piston. Also, a mechanical limit with a stopper or the like need not be provided, and hence the control ranges of the variable valve mechanisms can be increased, thereby, for example, reducing fuel consumption. Further, a loss of power, an increase in fuel consumption, and a decrease in exhaust performance as a result of an increase in a depth of a valve recess for a piston to avoid interference thereof can be prevented.

In addition, in the embodiments described herein, the variable valve controller further includes a first control unit (ECM 10) that controls the first variable valve mechanism (VTC mechanism); a second control unit (VEL-C/U 20) that controls the second variable valve mechanism (VEL mechanism); and a communication unit (30) provided between the first and second control units. The error detecting unit includes a unit of detecting a communication error of the communication unit (30). The time necessary for detecting the error with the error detecting unit includes a time necessary for detecting the communication error. Accordingly, a reliable response to the communication error can be provided.

In these embodiments, the time necessary for detecting the communication error is a predetermined constant or substantially constant time. Accordingly, the offsets OFS1 and OFS3 can be easily set.

The control units (ECM 10, VEL-C/U 20) each have the communication error detecting unit that monitors a message counter (ECMVELCK, VELECMCK), which is transmitted from the other control unit via the communication unit while being counted up every predetermined clock cycle, to detect a communication error. Accordingly, the communication error can be easily and reliably detected.

In addition, in the embodiments described herein, the variable valve controller further includes a sensor (VTC position sensor) that detects an actual valve timing of the first variable valve mechanism (VTC mechanism); and a sensor (VEL position sensor) that detects an actual valve lift of the second variable valve mechanism (VEL mechanism). The error detecting unit includes a unit of detecting an error of one of the sensors. The time necessary for detecting the error with the error detecting unit includes a time necessary for detecting the error of the one of the sensors. Accordingly, a reliable response to the sensor error can be provided.

Also, the time necessary for detecting the error of the one of the sensors is set in accordance with an engine speed such that the time is decreased as the engine speed is increased. Accordingly, the offsets OFS2 and OFS4 can be properly set, and hence, an excessive limit need not be provided.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A variable valve controller for an internal combustion engine, comprising:
   a first variable valve mechanism which changes a valve timing;
   a second variable valve mechanism which changes a valve lift, the first and second variable valve mechanisms being provided at least at one of an intake valve and an exhaust valve;
   an operation limiting unit that controls at least one of the first and second variable valve mechanisms on the basis of a limit value of the one of the first and second variable valve mechanisms, with the limit value being set on the basis of a control condition of the other one of the first and second variable valve mechanisms; and
   an error detecting unit that detects an error of the variable valve controller to cause fail-safe control to be performed,
   wherein the limit value set with the operation limiting unit is a limit value including a displacement by which the other one of the first and second variable valve mechanisms is displaceable within a time necessary for detecting the error with the error detecting unit.

2. The variable valve controller for the internal combustion engine according to claim 1, wherein the limit value set with the operation limiting unit is a limit value in which a limit basic value that is set for the one of the first and second variable valve mechanisms in accordance with the control condition of the other one of the first and second variable valve mechanisms is offset by the displacement by which the other one of the first and second variable valve mechanisms is displaceable within the time necessary for detecting the error with the error detecting unit.

3. The variable valve controller for the internal combustion engine according to claim 1, further comprising:
   a first control unit that controls the first variable valve mechanism;
   a second control unit that controls the second variable valve mechanism; and
   a communication unit provided between the first and second control units,
   wherein the error detecting unit includes a unit of detecting a communication error of the communication unit, and
   wherein the time necessary for detecting the error with the error detecting unit includes a time necessary for detecting the communication error.

4. The variable valve controller for the internal combustion engine according to claim 3, wherein the time necessary for detecting the communication error is a predetermined constant time.

5. The variable valve controller for the internal combustion engine according to claim 1, further comprising:
   a sensor that detects an actual valve timing of the first variable valve mechanism; and
   a sensor that detects an actual valve lift of the second variable valve mechanism,
   wherein the error detecting unit includes a unit for detecting an error of one of the sensors, and
   wherein the time necessary for detecting the error with the error detecting unit includes a time necessary for detecting the error of the one of the sensors.

6. The variable valve controller for the internal combustion engine according to claim 5, wherein the time necessary for detecting the error of the one of the sensors is set in accordance with an engine speed such that the time is decreased as the engine speed is increased.

7. The variable valve controller for the internal combustion engine according to claim 1, further comprising:
   a control unit that controls the first variable valve mechanism and the second variable valve mechanism; and
   wherein the error detecting unit includes a unit for detecting a communication error with the control unit, and
   wherein the time necessary for detecting the error with the error detecting unit includes a time necessary for detecting the communication error.

8. The variable valve controller for the internal combustion engine according to claim 7, wherein the time necessary for detecting the communication error is a predetermined constant time.

9. A method for operating a variable valve controller for an internal combustion engine, the method comprising:
   operating a first variable valve mechanism which changes a valve timing;
   operating a second variable valve mechanism which changes a valve lift, the first and second variable valve mechanisms being provided at least at one of an intake valve and an exhaust valve;
   controlling at least one of the first and second variable valve mechanisms on the basis of a limit value of the one of the first and second variable valve mechanisms, with the limit value being set on the basis of a control condition of the other one of the first and second variable valve mechanisms; and
   detecting an error of the variable valve controller to cause fail-safe control to be performed,
   wherein the limit value set during the controlling step is a limit value including a displacement by which the other one of the first and second variable valve mechanisms is displaceable within a time necessary for detecting the error.

10. The method according to claim 9, wherein the limit value set during the controlling step is a limit value in which a limit basic value that is set for the one of the first and second variable valve mechanisms in accordance with the control condition of the other one of the first and second variable valve mechanisms is offset by the displacement by which the other one of the first and second variable valve mechanisms is displaceable within the time necessary for detecting the error.

11. The method according to claim 9, further comprising:
    operating a first control unit that controls the first variable valve mechanism;
    operating a second control unit that controls the second variable valve mechanism; and
    operating a communication unit provided between the first and second control units,
    wherein the error detecting step includes detecting a communication error of the communication unit, and
    wherein the time necessary for detecting the error includes a time necessary for detecting the communication error.

12. The method according to claim 11, wherein the time necessary for detecting the communication error is a predetermined constant time.

13. The method according to claim 9, further comprising:
    operating a sensor that detects an actual valve timing of the first variable valve mechanism; and
    operating a sensor that detects an actual valve lift of the second variable valve mechanism,
    wherein the error detecting step includes detecting an error of one of the sensors, and
    wherein the time necessary for detecting the error includes a time necessary for detecting the error of the one of the sensors.

14. The method according to claim 13, wherein the time necessary for detecting the error of the one of the sensors is set in accordance with an engine speed such that the time is decreased as the engine speed is increased.

15. The method according to claim 9, further comprising:
    controlling the first variable valve mechanism and the second variable valve mechanism; and
    wherein the error detecting step includes detecting a communication error during the controlling of the first and second variable valve mechanisms, and
    wherein the time necessary for detecting the error includes a time necessary for detecting the communication error.

16. The method according to claim 15, wherein the time necessary for detecting the communication error is a predetermined constant time.

* * * * *